(12) United States Patent
Levovitz

(10) Patent No.: US 8,380,637 B2
(45) Date of Patent: Feb. 19, 2013

(54) VARIABLE FRACTIONS OF MULTIPLE BIOMETRICS WITH MULTI-LAYER AUTHENTICATION OF MOBILE TRANSACTIONS

(76) Inventor: Yerucham Levovitz, Spring Valley, NY (US)

( * ) Notice: Subject to any disclaimer, the term of this patent is extended or adjusted under 35 U.S.C. 154(b) by 0 days.

(21) Appl. No.: 13/007,629

(22) Filed: Jan. 16, 2011

(65) Prior Publication Data
US 2012/0185397 A1  Jul. 19, 2012

(51) Int. Cl.
*G06Q 20/00* (2012.01)
(52) U.S. Cl. ............... 705/71; 705/64; 705/67; 705/75; 380/277; 713/171
(58) Field of Classification Search ............... 705/71
See application file for complete search history.

(56) References Cited

U.S. PATENT DOCUMENTS

2004/0255081 A1* 12/2004 Arnouse .............. 711/115
2008/0041942 A1*  2/2008 Aissa ................... 235/382

FOREIGN PATENT DOCUMENTS

GB          2437761 A  * 11/2007

* cited by examiner

*Primary Examiner* — James A Reagan
(74) *Attorney, Agent, or Firm* — Shlomo Horowitz

(57) ABSTRACT

Virtually fraud-proof authentication for wireless mobile financial transactions. A mobile telephone, genius card or dongle may capture multiple biometrics, such as fingerprint, voiceprint, retinal recognition data, facial biometric data, ear biometric data and bio print, iris scanning data, pupil movement recognition data, and send segments of each of them to a server computer that re-constitutes them and stores them for matching during an attempted financial transaction. A purchasing individual has multiple biometrics read by separate readers integrated into a single hand-held device. An automatic process of the server computer has previously sent a command packet to the hand-held device defining percentage and portion of each biometric to select and the sequence and channel of transmission for matching along with other out of band security data. During the charging phase, the hand-held device may utilize a slidable antenna for swiping a magnetic strip of a charge card reader or may display credit card data for a limited amount of time.

20 Claims, 13 Drawing Sheets

All dimensions are approximate and can be adjusted.
The overall dimensions are:
Length=3.5"
Width=2"
Depth=0.5"

Mini USB connector centered in the middle from the side view

Key Chain Loop: This must be a strong loop to be used as an attachment to a key chain.
NOTE: We may need to include 4" chain with clasp Buttons:
These are two buttons which are the same size. The two buttons must be sealed. The buttons are curved for ease of use with a thumb or any finger. The button cavities must be designed to inhibit any liquid from entry.

LEDs: These are two LEDs. They are the same size. The LED cavities must be designed to inhibit any liquid from entry.
NOTE: The LEDs are centered on the two smaller buttons across from each LED.

See Note 1
Plug for Fingerprint reader

Clear Plastic Label Window with a paper label.
NOTE: There are finger depressions on both sides of the Clear Plastic Label Window to allow easy removal of the label window.

Button: This is one button that must be sealed. The button is curved for ease of use with a thumb or any finger. The button cavity must be designed to inhibit any liquid from entry. The button can be illuminated from a LED under the button.

FIG. 3

| METHOD – 100 |

PRIOR TO AN ATTEMPTED FINANCIAL TRANSACTION, READING INTO A FIRST BIOMETRIC READER INTEGRALLY ATTACHED TO A HAND-HELD DEVICE A FIRST BIOMETRIC DATA OF A FIRST TYPE FROM AN INDIVIDUAL, AND READING INTO A SECOND BIOMETRIC READER INTEGRALLY ATTACHED TO THE HAND-HELD DEVICE A SECOND BIOMETRIC DATA OF A SECOND TYPE FROM THE INDIVIDUAL, THE FIRST TYPE AND THE SECOND TYPE SELECTED FROM THE GROUP CONSISTING OF FINGERPRINTS, VOICE PRINTS, PUPIL MOVEMENT RECOGNITION DATA, IRIS SCANNING DATA, RETINAL RECOGNITION DATA, FACIAL BIOMETRIC DATA, EAR BIOMETRIC DATA AND BIO PRINTS — 110

AT A TIME OF AN ATTEMPTED FINANCIAL TRANSACTION BY A PURCHASING INDIVIDUAL, THE FIRST READER OF THE HAND-HELD DEVICE READING A FIRST BIOMETRIC DATA OF THE PURCHASING INDIVIDUAL AND A SECOND READER OF THE HAND-HELD DEVICE READING A SECOND BIOMETRIC DATA OF THE PURCHASING INDIVIDUAL — 120

USING A SERVER COMPUTER IN COMMUNICATION WITH THE HAND-HELD DEVICE TO SELECT A PERCENTAGE AND A PORTION OF EACH OF THE FIRST AND SECOND BIOMETRIC DATA READ BY THE FIRST AND SECOND READERS DURING STEP "120" THAT THE SERVER COMPUTER INSTRUCTS THE HAND-HELD DEVICE TO TRANSMIT TO THE SERVER COMPUTER, THE PERCENTAGE AND THE PORTION VARYING FROM ONE TRANSACTION TO ANOTHER — 130

THE HAND-HELD DEVICE WIRELESSLY TRANSMITTING TO THE SERVER COMPUTER THE INSTRUCTED QUANTITY AND PERCENTAGE OF EACH OF THE FIRST AND SECOND BIOMETRIC DATA — 140

DETERMINING WHETHER THE PURCHASING INDIVIDUAL IS AUTHORIZED TO PROCEED TO PAY FOR THE TRANSACTION USING A CREDIT CARD — 150

FIG. 5

METHOD – 200

AT A TIME OF ESTABLISHING AN ACCOUNT USABLE FOR TRANSACTIONS READING INTO A FIRST BIOMETRIC READER INTEGRALLY ATTACHED TO A HAND-HELD DEVICE A COMPLETE FIRST BIOMETRIC DATA OF A FIRST TYPE FROM AN ENROLLING INDIVIDUAL, — 210

READING INTO A SECOND BIOMETRIC READER INTEGRALLY ATTACHED TO THE HAND-HELD DEVICE A COMPLETE SECOND BIOMETRIC DATA OF A SECOND TYPE FROM THE ENROLLING INDIVIDUAL, THE FIRST TYPE AND THE SECOND TYPE SELECTED FROM THE GROUP CONSISTING OF FINGERPRINTS, PUPIL MOVEMENT RECOGNITION DATA, IRIS SCANNING DATA, RETINAL RECOGNITION DATA, VOICE PRINTS, FACIAL BIOMETRIC DATA, EAR BIOMETRIC DATA, AND BIO PRINTS — 216

CONVERTING THE COMPLETE FIRST AND SECOND BIOMETRIC DATA INTO MATHEMATICAL DATA; — 220

BREAKING THE FIRST AND SECOND BIOMETRIC DATA INTO SEGMENTS AND WIRELESSLY TRANSMITTING OVER A NETWORK INDIVIDUAL SEGMENTS OF THE FIRST AND SECOND BIOMETRIC DATA IN A FORM OF MATHEMATICAL DATA TO A SERVER COMPUTER LINKED TO A DATABASE FOR RE-COMBINATION BY THE SERVER COMPUTER AND ENTRY INTO A RECORD OF THE DATABASE AS A COMPLETE FIRST BIOMETRIC DATA AND AS A COMPLETE SECOND BIOMETRIC DATA — 230

AT A TIME OF AN ATTEMPTED FINANCIAL TRANSACTION BY A PURCHASING INDIVIDUAL, THE FIRST READER OF THE HAND-HELD DEVICE READING A FIRST BIOMETRIC DATA OF THE PURCHASING INDIVIDUAL AND A SECOND READER OF THE HAND-HELD DEVICE READING A SECOND BIOMETRIC DATA OF THE PURCHASING INDIVIDUAL — 240

FIG. 6A

METHOD 200 – CONTINUED

THE SERVER COMPUTER AUTOMATICALLY SELECTING A FIRST PERCENTAGE OF THE FIRST BIOMETRIC DATA STORED IN THE HAND-HELD DEVICE AND A SECOND PERCENTAGE OF THE SECOND BIOMETRIC DATA STORED IN THE HAND-HELD DEVICE TO BE TRANSMITTED TO THE SERVER COMPUTER FROM THE HAND-HELD DEVICE AND SENDING A COMMAND PACKET TO THE HAND-HELD DEVICE DEFINING A PERCENTAGE OF A BIOMETRIC FIELD FOR THE FIRST AND FOR THE SECOND BIOMETRIC DATA THAT THE HAND-HELD DEVICE SHOULD SEND TO THE SERVER COMPUTER AND DEFINING A PLACE WITHIN THE BIOMETRIC FIELD TO START SELECTING FROM

— 250

THE HAND-HELD DEVICE TRANSMITTING TO THE SERVER COMPUTER A COMPOSITE SECURITY DATA RECORD CONFORMING TO THE COMMAND PACKET INCLUDING FRACTIONAL BIOMETRIC DATA OF THE INDIVIDUAL IN A FORM OF MATHEMATICAL DATA AND INCLUDING OTHER SECURITY DATA, THE OTHER SECURITY DATA INCLUDING AT LEAST ONE OF (I) A PASSWORD, (II) AN ANSWER TO A SECURITY QUESTION, (III) GPS DATE, TIME AND LOCATION INFORMATION AND (IV) A KEY FOR THE HAND-HELD DEVICE, FOR AUTHENTICATION MATCHING AGAINST THE DATABASE DURING THE ATTEMPTED TRANSACTION OF THE PURCHASING INDIVIDUAL

— 260

DETERMINING WHETHER THE PURCHASING INDIVIDUAL IS AUTHORIZED TO PROCEED TO PAY FOR THE TRANSACTION USING A CREDIT CARD

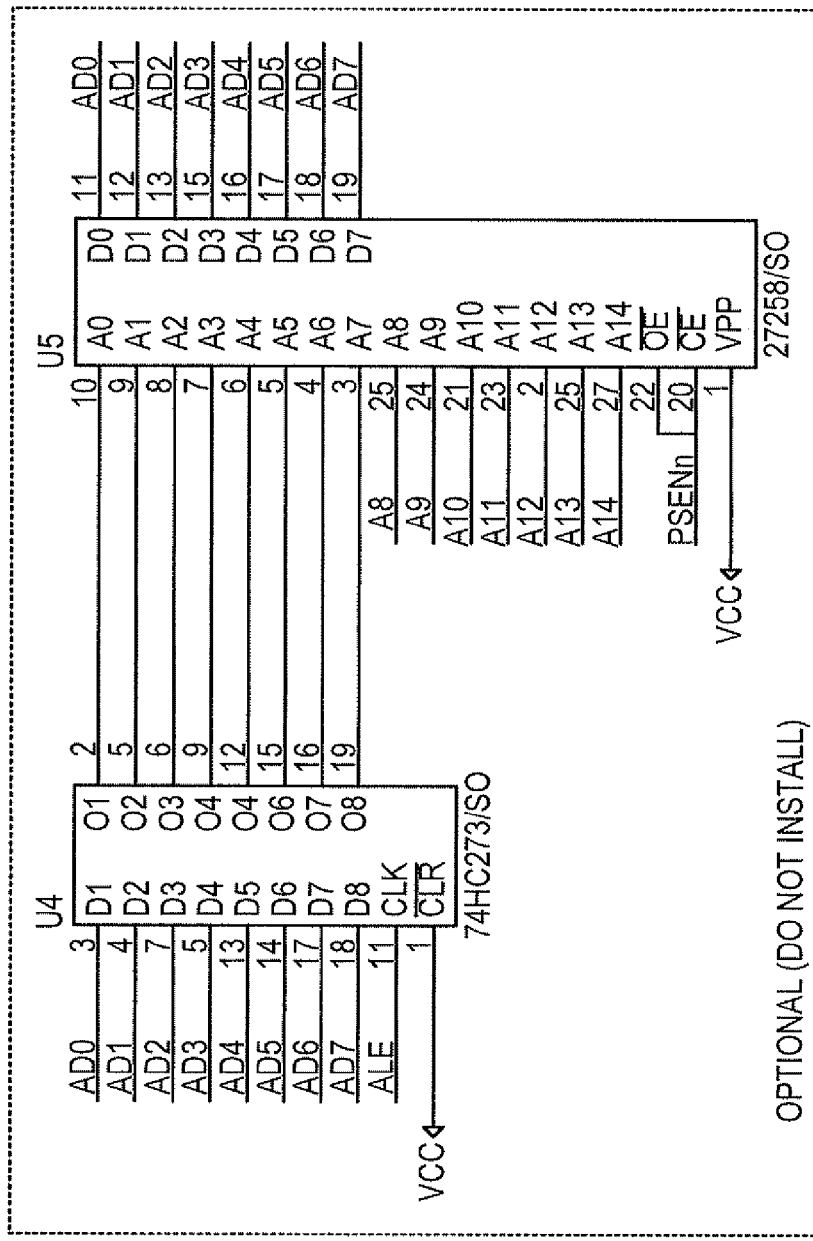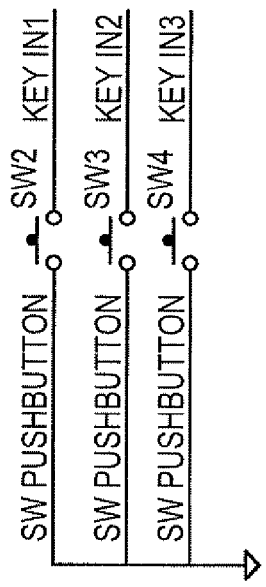
FIG. 11B

VARIABLE FRACTIONS OF MULTIPLE BIOMETRICS WITH MULTI-LAYER AUTHENTICATION OF MOBILE TRANSACTIONS

FIELD AND BACKGROUND OF THE INVENTION

The present invention relates to apparatuses and methods for biometric authentication and, more particularly, to using fractional components of different biometrics in a multi-layer authentication process for mobile financial transactions.

It has been estimated that the magnitude of credit card fraud in the United States alone is $8.7 billion annually. Identity theft in the context of wireless mobile communication devices used to make financial transactions is even more difficult to prevent since mobile networks are less secure. Despite the risks of fraud, there is a strong demand to use mobile communication devices to make purchases of goods and services. For many people such purchases are more convenient than those made from a fixed location, just like for many people mobile telephones are more convenient to use than land line phones.

There is therefore a compelling need for a method and a system for stopping credit card theft and other identity theft using improved authentication methods in the context of mobile financial transactions.

SUMMARY OF THE PRESENT INVENTION

One aspect of the present invention is directed to a method of identity authentication for transactions, comprising (a) at a time of establishing an account usable for transactions reading into a first biometric reader integrally attached to a hand-held device a complete first biometric data of a first type from an enrolling individual, reading into a second biometric reader integrally attached to the hand-held device a complete second biometric data of a second type from the enrolling individual, the first type and the second type selected from the group consisting of fingerprints, pupil movement recognition data, iris scanning data, retinal recognition data, voice prints, facial biometric data, ear biometric data, and bio prints; converting the complete first and second biometric data into mathematical data; breaking the first and second biometric data into segments and wirelessly transmitting over a network individual segments of the first and second biometric data in a form of mathematical data to a server computer linked to a database for re-combination by the server computer and entry into a record of the database as a complete first biometric data and as a complete second biometric data; (b) at a time of an attempted financial transaction by a purchasing individual, the first reader of the hand-held device reading a first biometric data of the purchasing individual and a second reader of the hand-held device reading a second biometric data of the purchasing individual; (c) the server computer automatically selecting a first percentage of the first biometric data stored in the hand-held device and a second percentage of the second biometric data stored in the hand-held device to be transmitted to the server computer from the hand-held device and sending a command packet to the hand-held device defining a percentage of a biometric field for the first and for the second biometric data that the hand-held device should send to the server computer and defining a place within the biometric field to start selecting from; (d) the hand-held device transmitting to the server computer a composite security data record conforming to the command packet including fractional biometric data of the individual in a form of mathematical data and including other security data, the other security data including at least one of (i) a password, (ii) an answer to a security question, (iii) GPS date, time and location information and (iv) a key for the hand-held device, for authentication matching against the database during the attempted financial transaction of the purchasing individual; and (e) determining whether the purchasing individual is authorized to proceed to pay for the transaction using a credit card.

A further aspect of the present invention is a system for securing financial transactions of a purchasing individual made from a mobile communication device, comprising a mobile communication device having integrally attached thereto a first reader of a first type of biometric data and a second reader of a second type of biometric data, the first and second types of biometric data selected from the group consisting of fingerprints, voice prints, pupil movement recognition data, iris scanning data, retinal recognition data, facial biometric data, ear biometric data and bio prints, the first reader reading a first biometric data and the second reader reading a second biometric data; a digital processor, operatively attached to the readers and programmed by software to convert any non-mathematical data in the first and second biometric data into a form of mathematical data, the digital processor also programmed to implement a command packet received during authorization of a financial transaction from a server computer containing command code delineating what percentages and what segments of each of the first and second biometric data to select for a composite security data record; a database for storing records of first and second biometric data and other security data of individuals enrolling in accounts used for financial transactions, the first biometric data and the second biometric data being in the form of mathematical data; a server computer linked to a telecommunications network and to the database and in communication with the hand-held device, the server computer having software that is compatable with the software of the mobile communication device, the server computer programmed to (a) automatically select how much of and which portions of the first and second biometric data in the hand-held device to be transmitted to the server computer and send a command packet to the mobile communication device defining these selections; (b) receive a composite security data record conforming to the command packet including fractional biometric data of the purchasing individual in mathematical form and including other security data, the other security data including at least one of (i) a password, (ii) an answer to a security question (iii) a key for the mobile communication device (iv) GPS location information for authentication metching against the database during the attempted financial transaction of the purchasing individual; and (c) determine whether the purchasing individual is authorized to proceed to pay for the transaction using a credit card.

A still further aspect of the present invention is directed to a method of identity authentication for mobile financial transactions, comprising (a) prior to an attempted financial transaction, reading into a first biometric reader integrally attached to a hand-held device a first biometric data of a first type from an individual, and reading into a second biometric reader integrally attached to the hand-held device a second biometric data of a second type from the individual, the first type and the second type selected from the group consisting of fingerprints, voice prints, pupil movement recognition data, iris scanning data, retinal recognition data, facial biometric data, ear biometric data and bio print; (b) at a time of an attempted financial transaction by a purchasing individual, the first reader of the hand-held device reading a first biometric data of the purchasing individual and a second reader of the hand-held device reading a second biometric data of the purchasing individual; (c) using a server computer in communication with the hand-held device to select a percentage and a portion of each of the first and second biometric data read by the first and second readers during step "(b)" that the server computer instructs the hand-held device to transmit to the server computer, the percentage and the portion varying from one transaction to another; (d) the hand-held device wirelessly transmitting to the server computer the instructed percentage and portion of each of the first and second biometric data; and (e) determining whether the purchasing individual is authorized to proceed to pay for the transaction using a credit card.

A further aspect of the present invention is a method of identity authentication for mobile financial transactions, comprising (a) prior to an attempted financial transaction, reading into a first biometric reader integrally attached to a hand-held device a first biometric data of a first type from an individual; (b) transmitting a second biometric data of a second type from the enrolling individual to a server computer over a telecommunications network, the first type and the second type selected from the group consisting of fingerprints, pupil movement recognition data, iris scanning data, retinal recognition data and voice prints, facial biometric data, ear biometric data, and bio prints; (b) at a time of an attempted financial transaction by a purchasing individual, the purchasing individual submitting the first biometric data through the hand-held device and the second biometric data through the telecommunications network; (c) a server computer in communication with the hand-held device using an automatic process to select a percentage and a portion of each of the first and second biometric data, the percentage and the portion varying from one transaction to another; (d) transmitting to the server computer the instructed percentage and portion of each of the first and second biometric data; and (e) determining whether the purchasing individual is authorized to proceed to pay for the transaction using a credit card.

A still further aspect of the present invention is directed to a method of identity authentication for mobile financial transactions, comprising (a) prior to an attempted financial transaction, reading and transmitting a multiplicity of security items associated with an enrolling individual to a server computer from a hand-held device, the hand held device reading at least two of the security items using readers of the hand-held device, the multiplicity of security items including at least a first biometric data of a first type and a second biometric data of a second type from the enrolling individual, the first type and the second type selected from the group consisting of fingerprints, pupil movement recognition data, iris scanning data, retinal recognition data and voice prints, facial biometric data, ear biometric data, and bio prints; (b) the server computer sending a command packet to the hand held device instructing a purchasing individual to transmit the multiplicity of security items, the command packet having contents including (i) what percentage and segment of each security item in the multiplicity to transmit to the server computer, (ii) which channel of communication to use for said transmission of each said percentage and segment, (iii) in what sequence should each of the channels of communication be used for the sending of each percentage and segment of said security item, the server computer using an automatic process to select the contents, the automatic process allowing the contents of the command packet to vary from one financial transaction to another; (c) at a time of an attempted financial transaction by an enrolled purchasing individual, the hand held device transmitting the multiplicity of security items to the server computer in accordance with the instructed percentage, segment, channel of communication and sequence specified in the contents of the command packet; and (d) determining whether an unknown purchasing individual sent a multiplicity of security items to the server computer using the hand held device in accordance with the instructions found in the contents of the command packet in order to determine if the unknown purchasing individual is an enrolled purchasing individual and is authorized to proceed to pay for the transaction.

These and other features, aspects and advantages of the present invention will become better understood with reference to the following drawings, descriptions and claims.

BRIEF DESCRIPTION OF THE DRAWINGS

Various embodiments are herein described, by way of example only, with reference to the accompanying drawings, wherein:

FIG. 3 is a top view of the device of FIG. 2, in accordance with one embodiment of the present invention;

FIG. 5 is a flow chart showing a method in accordance with one embodiment of the present invention;

FIGS. 6A-6B are a flow chart showing a further method in accordance with one embodiment of the present invention;

DETAILED DESCRIPTION OF THE INVENTION

Figure 1:
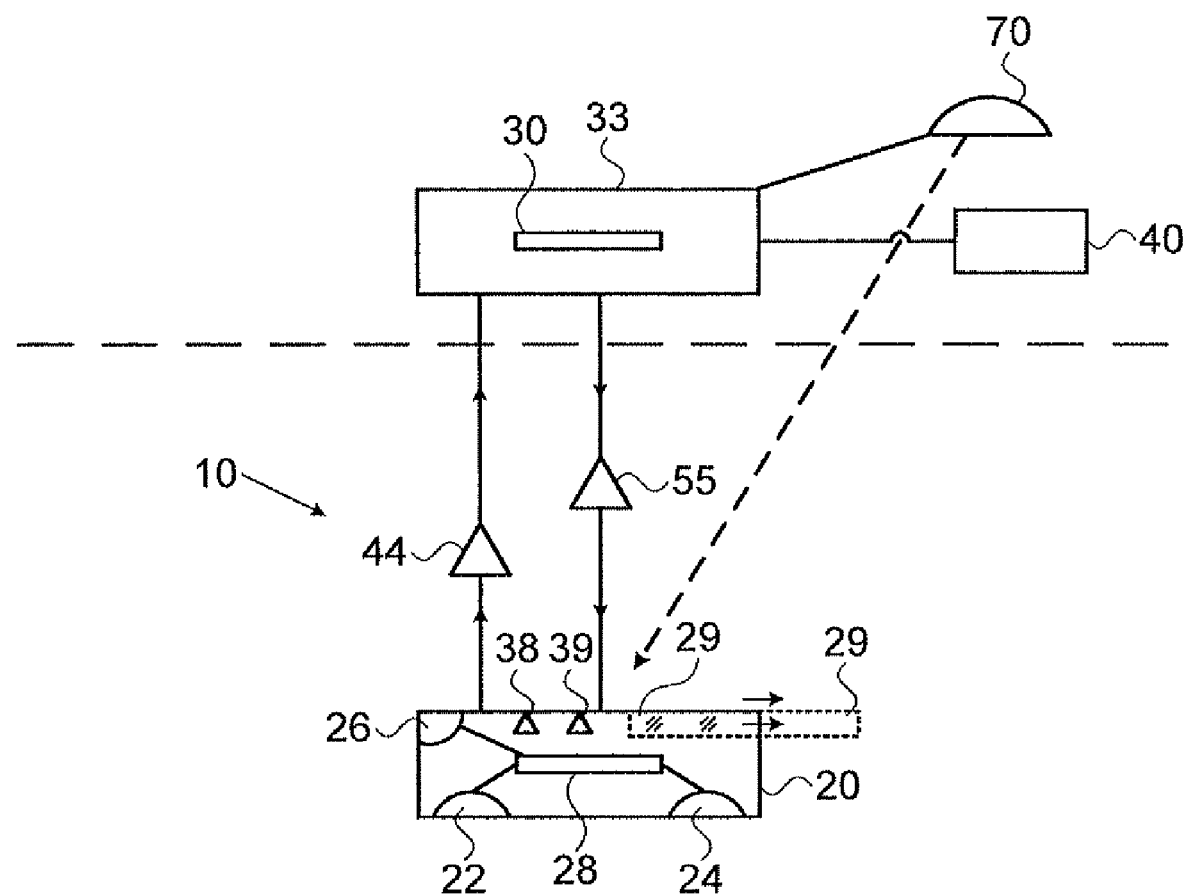
FIG. 1 is a schematic shows a system, in accordance with one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method and apparatus of virtually fraud-proof authentication which may be especially suitable for wireless mobile financial transactions throughout the world. A hand-held device, which may be a mobile telephone, a genius card or a dongle, may capture multiple biometrics, such as a fingerprint, a voiceprint and a retinal scan, send segments of each of them to a server computer that may re-constitute them and stores them in a database for matching during an attempted financial transaction. A purchasing individual may have multiple biometrics (e.g. two, three or more) read by separate readers integrated with a single hand-held device. An automatic process of the server computer may have previously sent a command packet to the hand-held device as to what percentage and what part of each biometric to transmit to the server computer for matching along with other security data, such as a password. During this process, alternative channel communications (e.g. GPS, password, answer to a security question including photo selection, unique key for the hand-held device, etc.) may provide additional layers of authentication validation. During the charging phase, depending on the type of charge card reader available, the hand-held device may utilize a slidable antenna for swiping a magnetic strip of a charge card reader or may display credit card data for a limited amount of time to prompt verbal recitation by the purchasing individual.

In contrast to prior art authentication methods and apparatuses for mobile financial transactions, in which biometrics authentication is not used, the present invention may utilize biometrics for authentication to provide a high level of security. In further contrast to prior art systems that typically use a single biometric in the context of a securing a single device or location, the present invention may utilize biometrics for securing wireless transactions across a network having millions of nodes. Moreover, the present invention may utilize two, three or more different types of biometrics to further enhance security for mobile transactions. In still further contrast to authentication methods that may utilize biometrics but in which a complete biometric may be transmitted, or in which a complete biometric may be used for matching and authentication, the present invention transmits only portions of the biometric and uses only a fractional portion of as biometric for matching. Furthermore, the present invention may utilize an automatically imposed variability in the selection of how much of a percent of the biometric to be selected by the hand-held device and of what part of the biometric is to be selected from. Accordingly, each transaction for the same purchasing individual may utilize a different fractional portion of each biometric and a different composite security record. Furthermore, since the present invention may combine multiple fractional biometrics with and other security data into a composite, and may vary the percentage and portion of each biometric that may be used, if the composite data that is transmitted is compromised, this information may not be useful to its possessor, including because the percentage and portion of the biometric that may be used for authenticating the next transaction may differ. Furthermore, in contrast to prior art storage and transmission of biometric data in image format, the biometric data of the present invention may be stored and transmitted in mathematical form, i.e. decimal or hexadecimal format, so it cannot be recognized as biometric information. In still further contrast to security authentication systems in which only in band communication is used, the present invention may utilize both in band communication and alternative channel communication during the authentication process for further layers of security. The alternative channel communications may include a GPS date, time and location information, a password, a photo selection or other answer to a security question, or the unique key of the hand-held device. In yet still further contrast with the prior art, in which a purchaser can charge a particular credit card by swipe a regular card through a card reader having a magnetic strip, move a smart card near a smart card reader or provide information verbally by telephone, but not both or all three using a single card, the hand-held device used in the present invention may be capable of being read in proximity of a smart card reader, since it may contain a microchip, and it may also be capable of being read by a traditional reader that is swiped along its magnetic strip. Furthermore, the device may be prompted to display credit card data to assist in a telephone purchase made verbally. In further contrast to the prior art, the device may have an antenna that may slide out and load credit card data and may then be used to swipe magnetic strip reader.

In further contrast to charging methods and apparatuses that are more insecure since the data is retained on the device that performs the swiping, the antenna used in the hand-held device of the present invention may have the added security feature whereby the data is automatically deleted after a preset amount of time or deleted automatically whenever the antenna is slid back into its original position inside the device.

The principles and operation of an apparatus and method for a method and system of authentication using variable fractions of multiple biometrics with multi-layer authentication in the context of mobile transactions according to the present invention may be better understood with reference to the drawings and the accompanying description.

Figure 2:
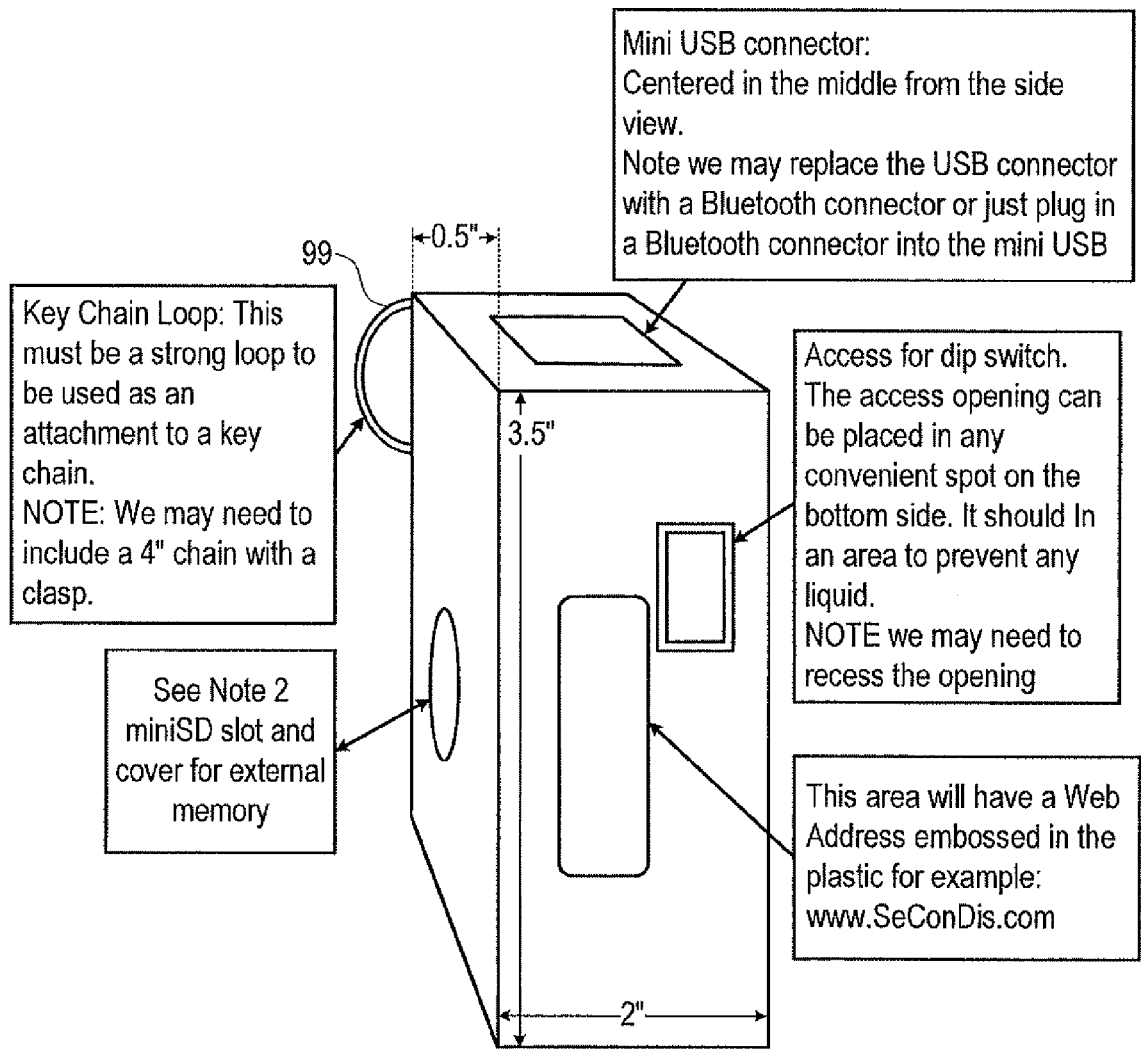
FIG. 2 is a side and bottom perspective view of a hand-held device used in a system or method of the present invention, in accordance with one embodiment of the present invention.

As seen from FIG. 1, the present invention may be described as a system 10 for securing financial transactions of a purchasing individual made from a mobile communication device. Alternatively, the transactions to be secured by system 10 may be transactions involving transfer of data or information. As shown in FIG. 2 and FIG. 3, system 10 may include a hand held device 20, sometimes called a mobile communication device 20, which may be a mobile telephone or it may be a dongle or genius card with wireless receiver and transmission capabilities. Hand-held device 20 may have integrally attached thereto a first reader 22 for reading a first type of biometric data, for example a fingerprint, and a second reader 24 for reading a second type of biometric data, for example a retinal scan. The first and second types of biometric data may be selected from the group consisting of fingerprints, voice prints, pupil movement recognition data and iris scanning data, retinal recognition data, facial biometrics including ear biometrics, and other bioprints. A third reader 26 may also be used for example for voice prints or any other type of the group not read by the first and second readers 22, 24. As shown in FIG. 3, the readers 22, 24 may be accessed by means of buttons 22A, 24A. As seen from FIG. 3, buttons 22A and 24A may have corresponding LEDs 23, 25 to illuminate the presence and location of the button for accessing readers 22, 24 at night or in the dark. FIG. 2 shows that the hand-held device may have a mini USB connector for transferring data to a personal computer. It should be understood that the hand-held device may utilize many forms or channels of communications including a private network, GPS, Telco, USB, Bluetooth, WIFI, infra red, near field communications, GSM, TDMA, 802.11, etc. The network option can either be user or selected by the device.

The hand-held mobile communication device 20 may include a digital processor, such as a microprocessor 28 that may be operatively attached to the readers 22, 24 and programmed by software to convert any non-mathematical data in the first and second biometric data into a form of mathematical data. Microprocessor 28 may also be programmed to implement a command packet 55 received during authorization of a financial transaction from server computer 30 containing command code delineating what percentages and what segments of each of the first and second biometric data to select for a composite security data record. Hand-held device 20 may also include a wireless receiver 38 and transmitter 39 for communicating to server computer 30 that may be linked to a global telecommunications network. When communicating to a network, the device 20 may have an option to employ encryption. The option to use encryption may be invoked by the hand-device device 20, by the telecommunications network, by the database 40 or as a result of the GPS system.

FIG. 1 shows that system 10 may also include a database 40 for storing records of first and second biometric data and other security data of individuals enrolling in accounts used for financial transactions. The records of the first biometric data and the second biometric data may be stored in the form of mathematical data, i.e. decimal or hexidecimal format. The term "database" as used herein shall be understood to include both centralized and distributed databases.

As further seen from FIG. 1, system 10 may include a server computer 30 linked to a telecommunications network (such as the Internet) and to the database 40 and in communication with the hand-held device 20. The term "telecommunications network" is understood to refer broadly to a global telecommunications network such as the Internet, to private networks, wife, and other telecommunications networks. The server computer 30 may have software that may be compatable with the software of the mobile communication device. The server computer 30 may include a digital processor 33 and may be programmed to (or may have a computer readable storage medium having computer readable code embodied therein that comprises instructions to):

(a) automatically select how much of and which portions of the first and second biometric data in the hand-held device to be transmitted to the server computer and send a command packet to the mobile communication device defining these selections;

(b) receive a composite security data record 44 conforming to the command packet including fractional biometric data of the purchasing individual in mathematical form and including other security data, the other security data including at least one of (i) a password, (ii) an answer to a security question (iii) a key for the mobile communication device (iv) GPS location information, for authentication matching against the database during the attempted financial transaction of the purchasing individual; and (c) determine whether the purchasing individual is authorized to proceed to pay for the transaction using a credit card and notify a credit card company of an authorization decision. Accordingly, the server computer may be programmed to match each element of the composite security data record against the database during an attempted financial transaction of the user. the server computer may also be in operational communication with a UPS system 70 for monitoring a location of a user making an attempted financial transaction, the GPS in operational communication with a receiver of the mobile communication device of the user. System 10 may also accumulate a data profile concerning an enrolling or purchasing individual that categorizes such person's risk level concerning a likelihood of being involved with a fraudulent transaction. This may utilize risk factors stemming from data accumulated from in band and alternative channel communications during previous and current transactions.

In some embodiments, server computer 30 or a different server computer may also initiate a remote biometric authentication of the enrolling or purchasing individual such as by voice recognition or such as by demanding that an image/photo of the individual be sent for verification through a telecommunications network. Accordingly, the present invention contemplates making use of biometrics through hand-held device 20 in combination with biometrics that may be implemented through the telecommunications network (such as through a server computer) without hand-held device 20.

Charging the Account after Authentication

Figure 4:
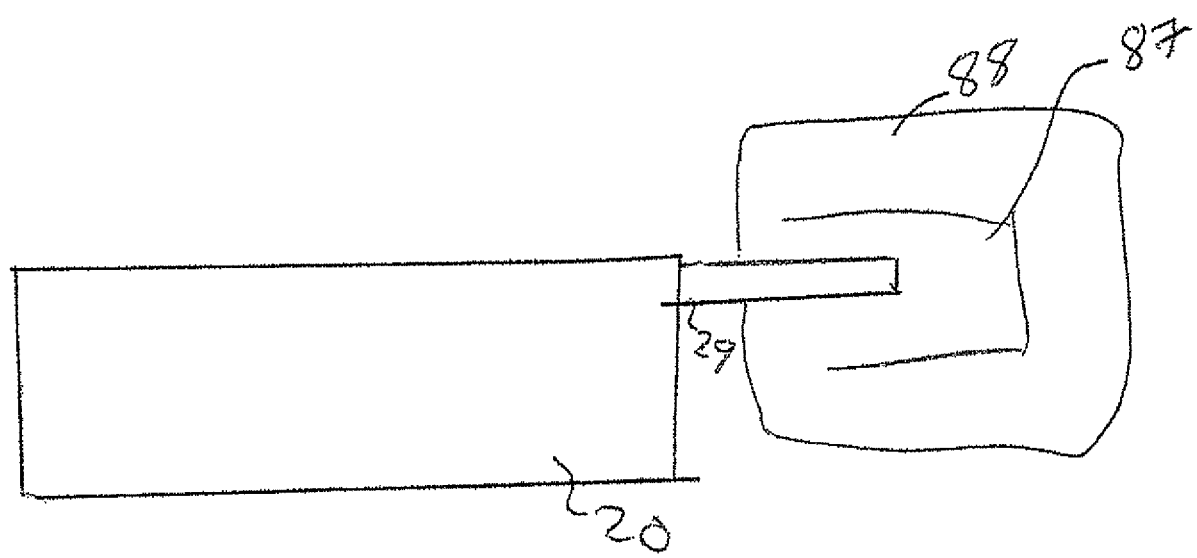
FIG. 4 is a perspective view of a hand-held device with an antenna for use in a charging mechanism, in accordance with one embodiment of the present invention.
Figure 7:
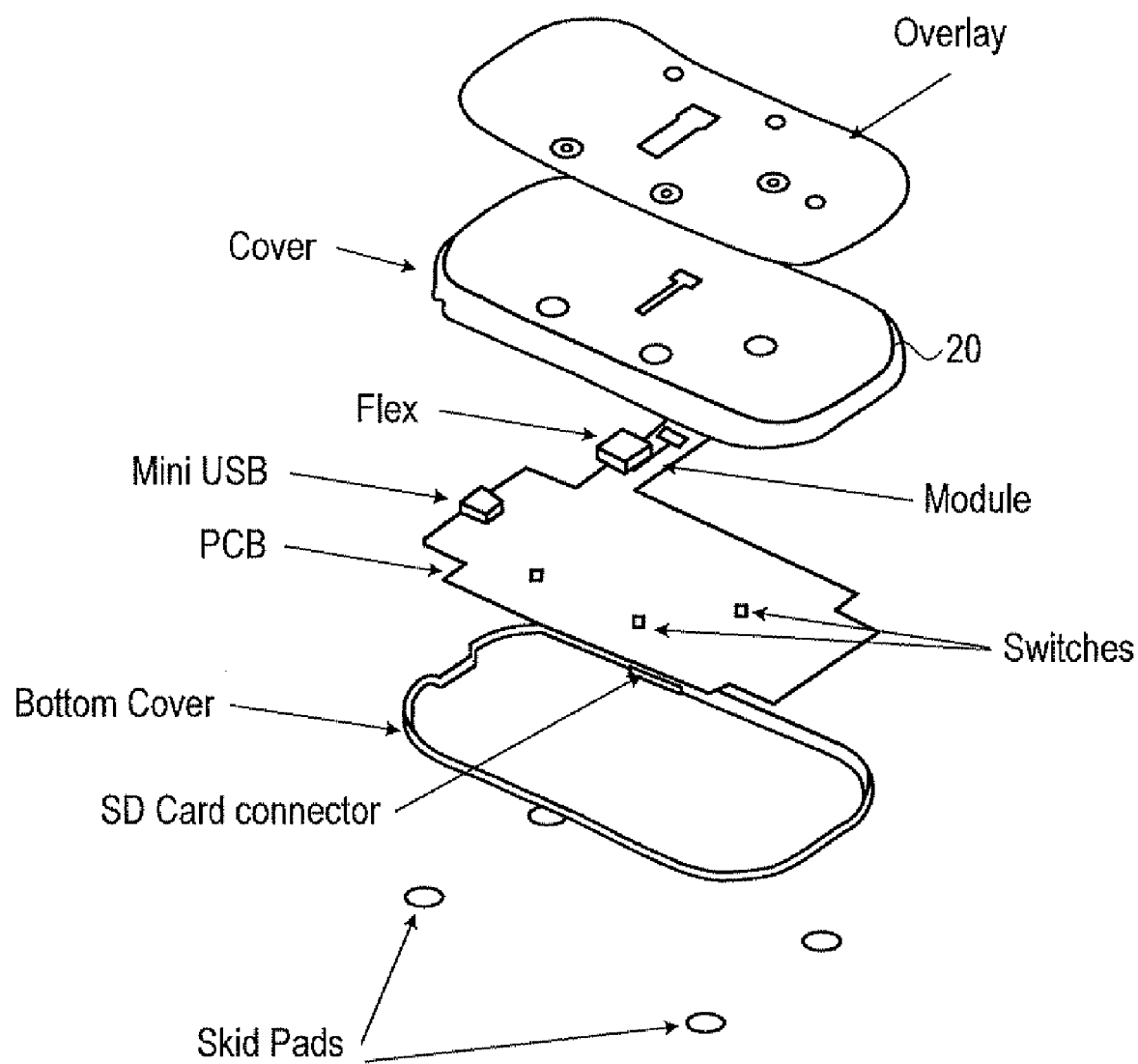
FIG. 7 is an exploded view of a hand-held device used in a system or method of the present invention, in accordance with a further embodiment of the present invention.
Figure 8A:
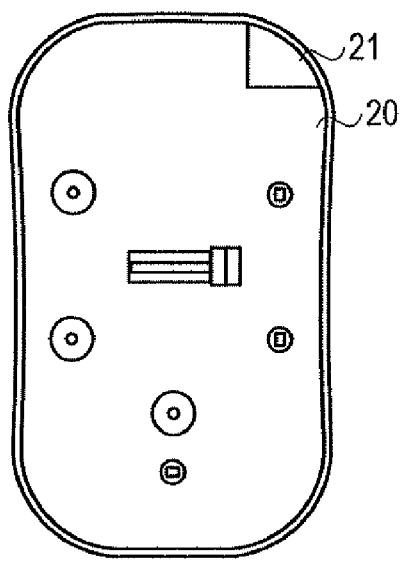
FIGS. 8A, 8B and 8C are top, perspective and side views respectively, of the hand-held device of FIG. 7, in accordance with one embodiment of the present invention.
Figure 8B:
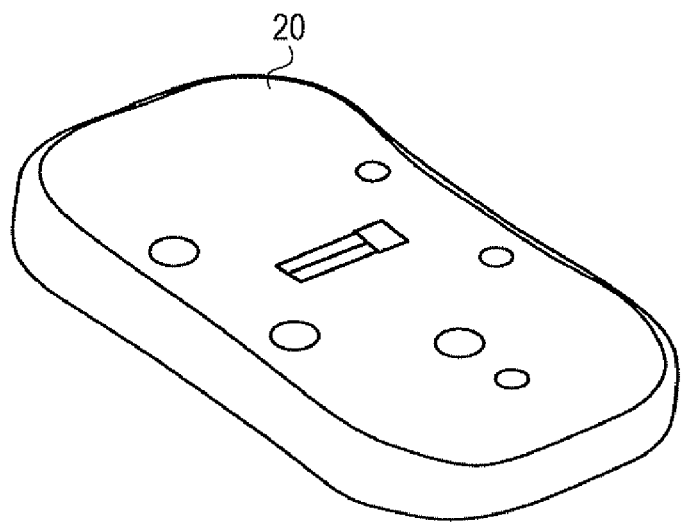
Figure 8C:
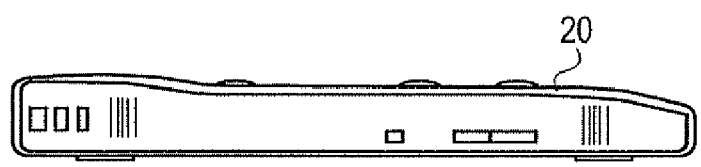
Figure 9:
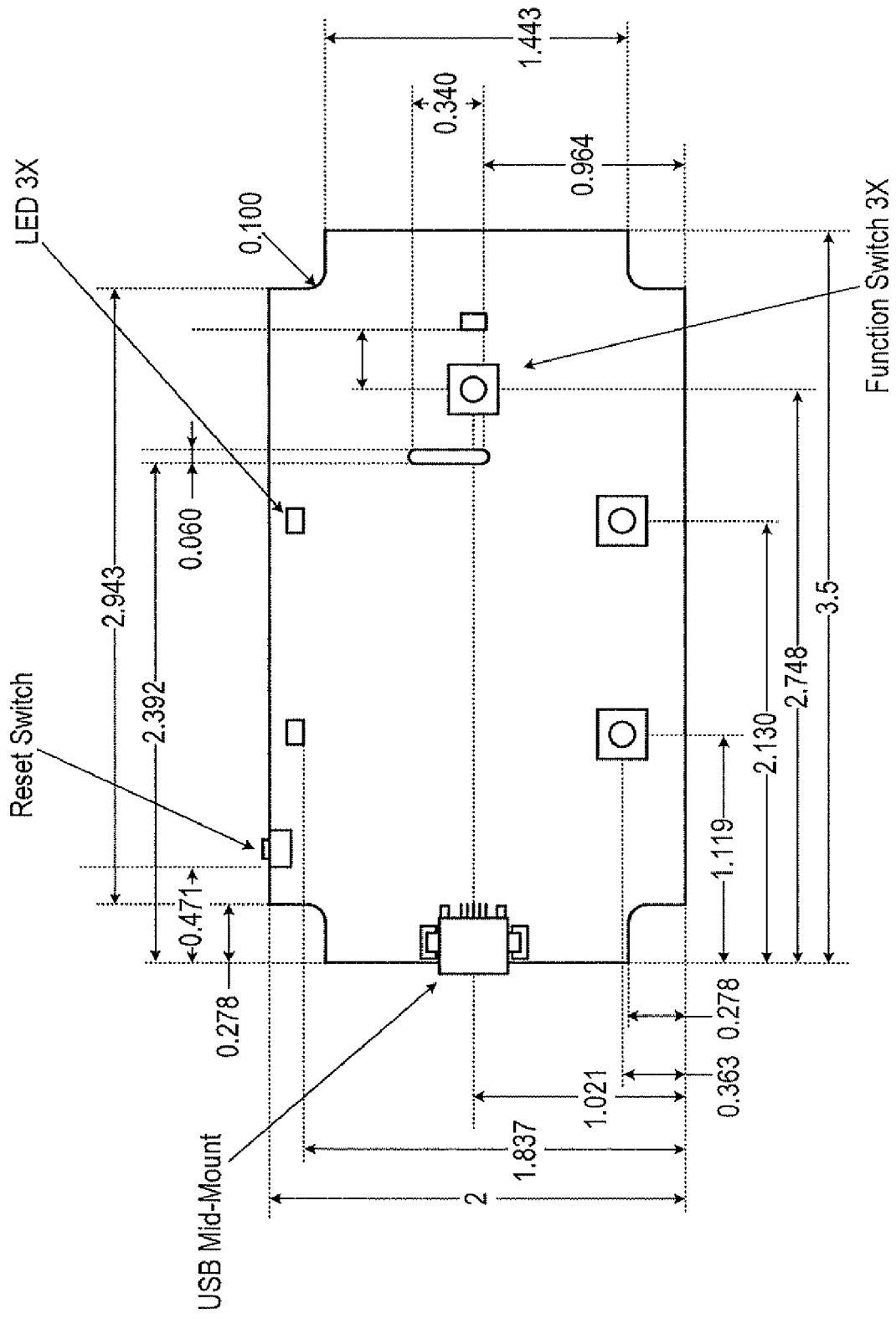
FIG. 9 and FIG. 10 are top and bottom views, respectively, of a printed circuit board that may be used in the hand-held device, in accordance with one embodiment of the present invention.
Figure 10:
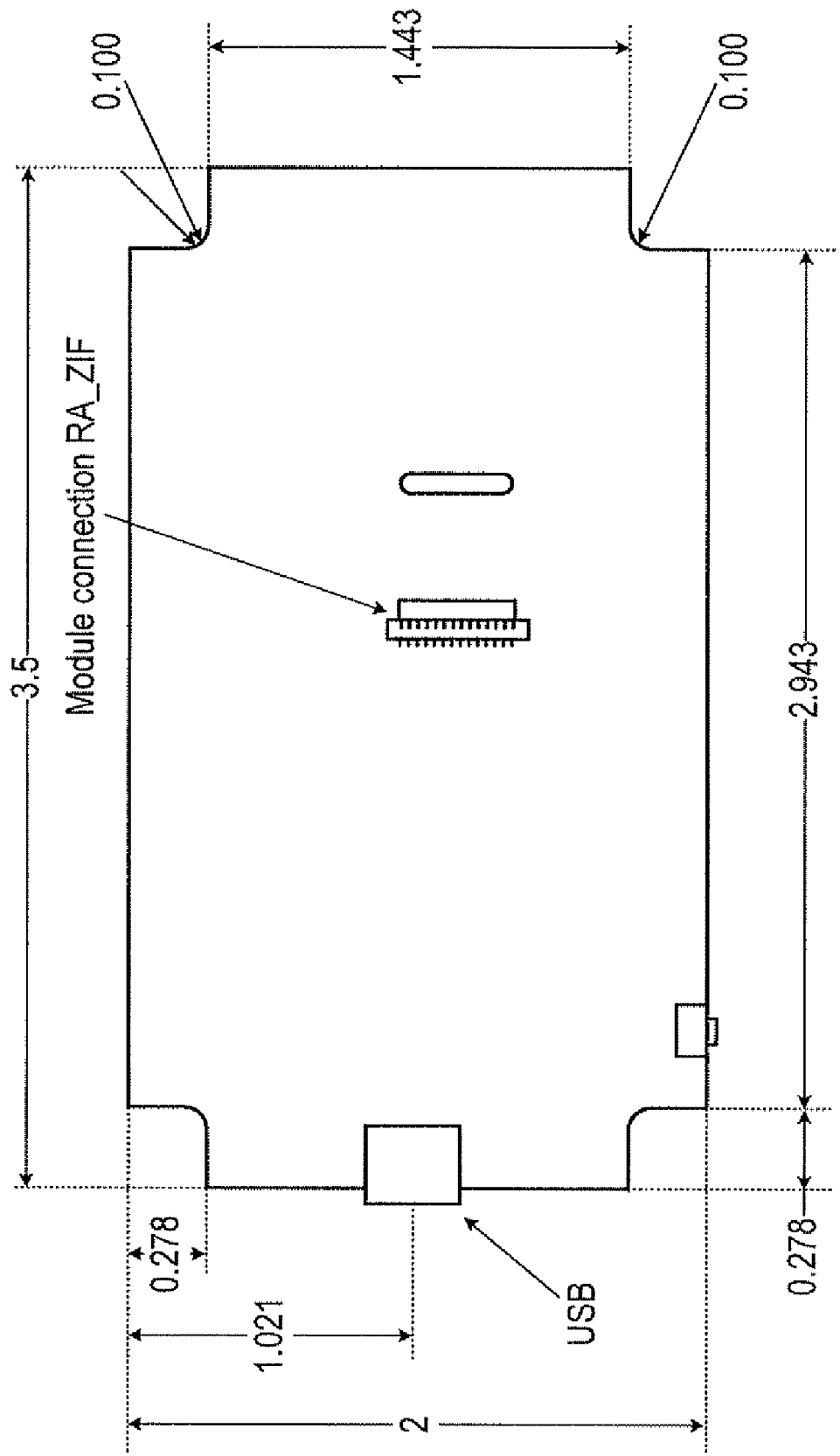
Figure 11A:
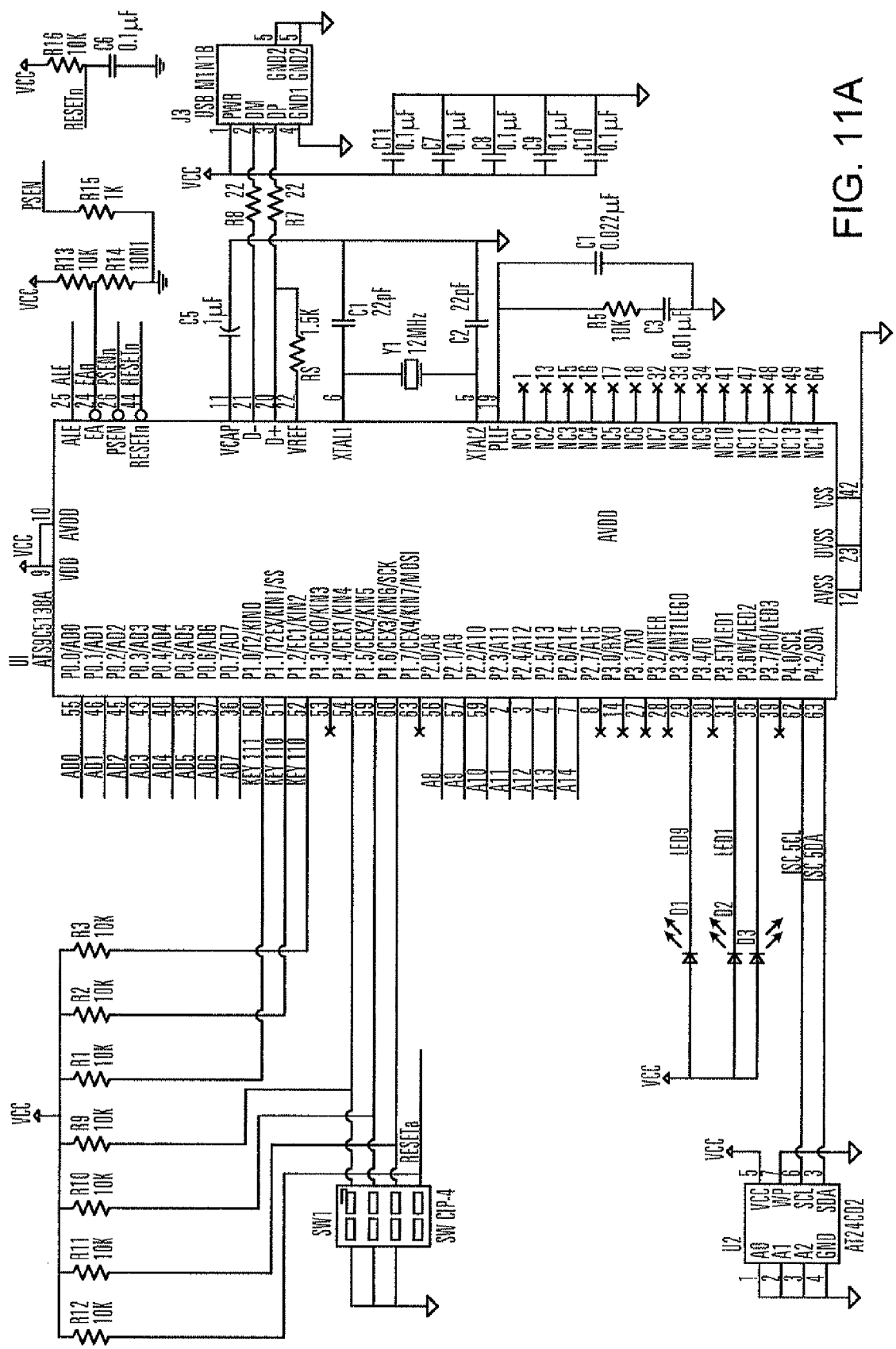
FIG. 11 is an electrical schematic that may be used in the hand-held device, in accordance with one embodiment of the present invention.

Once the authentication process has been approved, assuming it has been approved, charging the transaction may be accomplished in one of three ways: (i) a credit card having a magnetic strip incorporating credit card data may be swiped across a traditional magnetic strip credit card reader, (ii) a smart card having an embedded chip may be "swiped" near a smart card reader or (iii) the hand-held device may be prompted to display the credit card information on a display 21 (see FIG. 8A) and the purchasing individual may verbalize the information over a mobile communication (or other communication) device Accordingly, as shown in FIG. 1 and in FIG. 4, the mobile communication device 20, may also include an antenna 29 that may be actuated to slide from a first position inside the mobile communication device to a second position projecting out of the mobile communication device 20, the antenna 29 capable of storing charging data and being read by a magnetic strip 87 of a charge card reader 88 upon being swiped to charge the purchasing individual's account for the financial transaction. The antenna 29 may be swiped to charge the transaction while the antenna 29 is attached to the hand-held device. The antenna 29 may also be detachable from device 20 to allow easier use in traditional credit card and debit card readers. The hand-held device 20 may load charging data onto the antenna 29 integral to the hand-held device 20 by a prompt such as pushing a button on hand-held device 20, The digital processor 28, which may be a microprocessor, may be programmed to automatically delete the charging data from the antenna 20 (whether detachable or not) a pre-defined short time after the charging data is loaded onto the antenna 29. The "pre-defined short time" during which the data is on the antenna 20 may for example be defined to defined to be some period less than five minutes, for example 30 seconds, 45 seconds, 60 seconds, 90 seconds, 2 minutes, etc. Instead, or in addition to automatic deletion after a pre-defined short time period, the digital processor 28 may be programmed to automatically delete the charging data from the antenna when the antenna is slide back to the second position inside the hand-held device/mobile communication device.

In addition, in order to assist a purchasing individual in verbally providing credit card information for example over a telephone, or at a web site, the hand-held device may be prompted to send credit card charging data to a display of the hand-held device to assist in charging account without swiping a charge card reader.

Applicant has discovered that between 40% and 75% may be maintained and used to verify and that amount is not enough to allow a thief of the data to use it in other places Mathematical data includes data in decimal or hexadecimal format and excludes images such as a pdf file. Mathematical data can also include use of a function to describe mathematical data. Mathematical data also includes an electric signal tied to mathematical data. "Financial transactions" refers to purchases of goods and/or services. Such transactions may have the option to utilize encryption of the data during the transaction.

A "genius card" may be understood to be a smart card whose functionality exceeds that of typical smart cards, for example, by having a biometric reader integrated within it or integrally attached to it. A "mobile communications device" refers to a hand-held device that may transmit and receive wirelessly, whether it offers voice transmission capabilities or not. A mobile telephone does offer voice transmission capabilities. In contrast, a dangle, such as is depicted in FIGS. 2 and 3, having a transmitter and receiver can be considered a kind of mobile communication device in that it can wirelessly receive and transmit messages to and from the server computer 30. The term "dongle" is not referring to the device that connects to a USB port, a Bluetooth, IR, NFC, WIFI, etc. but is referring to a stand-alone device usually associated with a key chain 99, such as is shown in FIG. 2. Such a stand-alone device may be used to store personal information and has been dubbed a Person Information Network Connection (PINC) by Applicant. A genius card that has a transmitter and a receiver for wireless communication with the server computer is a mobile communication device also. However, a dongle or a genius card do not provide for voice transmission capability.

In some embodiments, the hand-held device 20 can also be an info cation storage tag. An "information storage tag" means the information storage tag described in any of the claims of United States Patent Application Publication No. US 2009/0008443 A1, Jan. 8, 2009 entitled "Information Storage Tag System for Use and method" by Applicant Yeruchem Levovitz, et al., which published patent application is herein incorporated herein in its entirety except that the information storage tag holds critical data which typically although not necessarily is medical data.

An answer to a security question shall be understood to mean the traditional security question answered at the time of enrollment in a format such as "what is your favorite _____", "what is your mother's maiden name", etc. but it also shall be understood to include selection of the correct photo among a group of photos presented (i.e. displayed on the hand-held device or through the telecommunications network). For example, the purchasing individual may be asked to choose a photo among a group of photos based on whether one of the photos displayed is among a second group of photos previously provided or selected by the enrolling individual. The photos in the second group of photos can be the user's own photos and can be photos supplied by or under the direction of the server computer.

The server computer 30 may use an automatic process (which may be random, or deterministic) in order to select a first percentage of the first biometric data and a second percentage of the second biometric data to be transmitted to the server computer from the hand-held device. The term "automatic process" is understood to both include random generation of numbers, pseudorandom number generators, non-deterministic and deterministic algorithms. So for example the percentage may be selected by a random number generator or may be selected by associating the percentage with a day of the month. The algorithm may select a percentage based on a what number financial transaction the transaction is or what number financial transaction the transaction is for the specific purchasing individual.

The server computer 30 may control the selection made by the had-held device by sending a message in the form of a command code to software in the hand-held device (sometimes called a "command packet") wirelessly over the Internet or other telecommunications network. Each biometric may occupy a field within a composite biometric data record or a composite security data record which may include both biometric and non-biometric data fields. The command packet 55 sent to the hand-held device 20 may for example define the percentage of the first field, i.e. the fingerprint biometric, to be transmitted as 29% and may define as 44% the percentage of the second field, i.e. the voice print biometric, to be sent by the hand-held device to the server computer 30.

Furthermore, the command packet 55 may also define what segment of the complete biometric to be used, for example by defining what place within the biometric field to start selecting from. As an example, the 29% of the fingerprint may come from the first 29% starting from the very beginning of the fingerprint biometric, starting from the second quadrant the third quadrant or the fourth quadrant of the fingerprint biometric. In this example, if the 29% were to start from the last quadrant or quarter of the complete fingerprint biometric, the remaining 4% may be selected by continuing from the very beginning of the biometric. In this way a composite security data record may be created by the hand-held device at the direction of the server computer. The composite security data record may include non-biometric data such as a password, a security question and one of the photos that the user selected upon enrollment of the account.

In any method or system of the present invention, the command packet may be sent by the server computer to the hand-held device 20 at different points in time. One way is for the command packet relevant to the nth financial transaction to have been sent during or at the end of the authentication process of the (n−1)th transaction when the server computer communicated with the hand-held device for authentication during that (n−1)th transaction. In the case of authentication of the first financial transaction, the command packet may be sent earlier during enrollment of the account. In order for the command packet sent by the server computer to be accepted by the hand-held device, the server computer's software may be compatible with the software of the hand-held device.

It is also contemplated that during approval of the charge after authentication, the charge data may be coupled with GPS data to further verify the purchasing individual and add to a profile of the purchasing individual. In case fraud is suspected during the authentication process or during the charge approval process, device 20 may be programmed to ring or play an alert message. Such an alert message may also a request to subject the purchasing individual to further verification, which may include requesting additional data.

As shown in FIG. 5, the present invention may also be characterized as a method 100 of authenticating identity for mobile financial transactions. A first step 110 of method 100, which may occur prior to the attempted transaction, such as a financial transaction, for example during enrollment of the account or at another time. Step 110 may involve reading into a first biometric reader integrally attached to a hand-held device a first biometric data of a first type from an individual and reading into a second biometric reader integrally attached to the hand-held device a second biometric data of a second type from the individual. In another variant, step 110 may involve reading into a first biometric reader integrally attached to the hand-held device 20 the first biometric data of the first type from the individual and transmitting biometric data of a second type to a server computer through a telecommunications network. In either case, both the first type and the second type of biometric data may be selected from the group consisting of fingerprints, pupil movement recognition data, iris scanning data, retinal recognition data, voice prints, facial biometrics including ear biometrics and other bio prints.

This biometric data may include complete biometrics for each type but may be broken into segments by the hand-held device microprocessor and may be sent, for example in pieces, to the server computer for storage in a database linked to the server computer for later re-combination into a whole biometric for later matching. The database may store the biometrics in a complete form in a mathematical data form (e.g. decimal or hexidecimal). The database 40 may include records and each record may have multiple fields, one for each biometric or other piece of security data. As an example, the first complete biometric may be stored in the first field of the security record for the enrolling individual, the second biometric may be stored in the second field. The third, fourth and fifth, etc. fields may be comprised of other security data, such as passwords, answer to a security question, hand-held device key, GPS date, time and location information, etc. so that one or more of the multiple biometrics may be combined with security data obtained through multiple channel communications. Accordingly, the hand-held device, besides supplying biometric data, may also supply characteristic data of the hand-held device such as key, GPS, IP, etc.

Method 100 may also include a step 120 that may occur at the time of the attempted transaction, such as a financial transaction, by a purchasing individual. In step 120, the first reader of the hand-held device 20 may read a first biometric data of the purchasing individual and a second reader of the hand-held device 20 may read a second biometric data of the purchasing individual. Accordingly, the purchasing individual may be complying with a requirement to identify himself for the transaction by submitting multiple biometrics through use of the hand-held device 20 that the purchasing individual is carrying around. The device may be a mobile telephone, a dongle or a genius card, (as defined above). The "purchasing individual" is the actual person making the attempted financial transaction. In order for the authentication to be approved the purchasing individual must be the enrolling individual or the individual or individuals who enrolled or individuals who later provided authentication details including biometrics for the account. If the hand-held device was misappropriated or if security data such as biometrics was misappropriated, or even if the enrolling individual innocently but incorrectly allowed a different person to use his hand-held device, the authentication will fail to match and charging will not proceed to the charging phase of the financial transaction.

In a further step 130 of method 100, a server computer in communication with the hand-held device 20 may be used to vary a percentage and a portion of each of the first and second biometric data read by the first and second readers during step 120 that the server computer instructs the hand-held device 20 to transmit to the server computer 30 wirelessly. By "vary a percentage and a portion" what is meant is that what the server computer 30 chooses on one occasion as the particular percentage of a biometric and/or the particular portion of a biometric that the hand-held device may be instructed to transmit may differ and in fact is expected to differ from the percentage and/or portion of the biometric that the server computer may choose to have the hand-held device 20 transmit on a different occasion. The terms "portion" and "segment" are used interchangeably.

In step 140, the hand-held device may transmit, for example wirelessly, to the server computer the percentage and portion of each of the first and second biometric data instructed by the server computer in step 130. For example, the server computer may send a command packet instructing the hand-held device to select 23% of the fingerprint and 45% of the voice print. Further, the command packet may identify which portion of each biometric data to start from. As example, the fingerprint data, whether in image or mathematical format may be divided into segments, for example four quadrants. Illustratively, then, the command packet may instruct the hand-held device 20 to select 23% of the fingerprint beginning with the second quadrant of the fingerprint data and send it to the server computer for matching against a database of biometrics. Prior to the server computer sending the command packet, server computer 30 may vary the percentage and portion of the biometric data by using an automatic process to select a percentage for each of the first and second biometric data and to select which part of the first and second biometric data to start selecting from.

Step 140 of method 100 may involve having the server computer 30 or another entity determine whether the purchasing individual is authorized to proceed to pay for the transaction using a credit card and notifying a credit card company of an authorization decision. This may occur after matching the security data supplied by the purchasing individual against database biometrics and other security data in the database for that individual, and after using other security data access methods through alternative channel communications such as: GPS information about where the transaction is occurring relative to location information previously provided or collected, the key of the hand-held device, a password request, a security question that may include a photo, the time and date of the financial transaction, etc. An algorithm in the software used by the server computer may define what is an acceptable level of matching for purposes of the authentication process. Once the threshold level of matching has occurred, the credit card company may receive approval to proceed to allow charging of the charge.

In the above method, two biometrics were used from the group of types of biometrics. In reality, more than two biometric types may be used. In that case, prior to the attempted financial transaction, reading into a third biometric reader integrally attached to the hand-held device 20 a complete third biometric data of a third type selected from the group. For example, the third type can be a retinal scan if the first two types were fingerprints and voice prints. Further, at the time of the attempted financial transaction by the purchasing individual, the third reader may read a third biometric data of the purchasing individual. The server computer may vary a percentage and a portion of the third biometric data read by the third reader at the time of the attempted financial transaction by the purchasing individual and the hand-held device may wirelessly transmit to the server computer the percentage and portion of the third biometric data selected by the server computer.

FIG. 6 shows another version of an identity authentication method of the present invention. Method 200 is a method of identity authentication for transactions, such as financial transactions, in which as a first step 210, at a time of establishing an account usable for financial transactions, the enrolling individual may read into a first biometric reader integrally attached to a hand-held device a complete first biometric data of a first type of that enrolling individual and may read into a second biometric reader integrally attached to the hand-held device a complete second biometric data of a second type from that enrolling individual. The first type and the second type may be selected from the group consisting of fingerprints, pupil movement recognition data, iris scanning data, retinal recognition data and voice prints. In some embodiments the group consists also of palm prints or other biometric data.

Step 220 may involve converting the complete first and second biometric data into mathematical data, such as hexadecimal or decimal so that if someone misappropriates the data or finds it, it would not be useful. "Converting . . . into mathematical data" should be understood to mean if there is anything not in mathematical data format it is converted and if not then leaving the data as is.

Step 230 of method 200 may involve breaking the first and second biometric data into segments and wirelessly transmitting over a telecommunications network individual segments of the first and second biometric data in a form of mathematical data to a server computer linked to a database for recombination by the server computer and entry into a record of the database as a complete first biometric data and as a complete second biometric data.

Method 200 may include a further step 240 in which at a time of an attempted financial transaction by a purchasing individual, the first reader of the hand-held device reads the first biometric data of the purchasing individual, who if there was no fraud is also the enrolling individual, and a second reader of the hand-held device reads the second biometric data of the purchasing individual. For example, if when enrolling a fingerprint and a retinal scan was read by the hand-held device, then during the attempted financial transaction, the protocol may be to have the purchasing individual (whoever that individual is) have their fingerprint and retinal scan read into the device by the first and second reader. The server computer may recognize that for this account the fingerprint and the retinal scan were used during enrollment and so require the use of these biometrics during financial transaction authentication.

If the hand-held device 20 contain readers suitable for reading only two types of biometrics, the server computer may automatically request that precisely those two biometrics be read in during the attempted financial transaction. However, if the hand-held device provided for three or more biometric readers suitable for reading data from three or more biometrics, then either the server computer may be programmed to demand those biometrics that were in fact used during enrollment of that account, which may vary for the individual, or alternatively the server computer may always require the same three (or more) types of biometric data for everyone enrolled in the system 10, since the system 10 may utilize only hand-held devices 20 of that type. In another scenario, the system 10 could provide more than one type of hand-held device 10. For example, some account holders may have a hand-held device 10 that has three readers of three different types of biometric data (e.g. fingerprint reader, a voice print reader and a retinal scan reader) and other accountholders may have a hand-held device 20 that has two readers of two different types of biometrics. Examples illustrating two readers of two different types of biometrics would be (i) a fingerprint reader and a retinal scan reader, (ii) a voice print reader and a fingerprint reader, (iii) a pupil movement recognition data reader and a voice print reader, etc.

In a further step 250 of method 200, the server computer may utilize an automatic process to select a first percentage of the first biometric data stored in the hand-held device 20 and a second percentage of the second biometric data stored in the hand-held device 20 to be transmitted to the server computer 30 from the hand-held device 20 and may send a command packet 55 to the hand-held device 20 that may have command codes defining what percentage of a biometric field for the first biometric data and what percentage of a biometric field for the second biometric data should the hand-held device 20 send to server computer 30. In addition, command packet 55 sent by server computer 30 may also define what place within each biometric field to start selecting the percentage from. Server computer 30 may send the command packet to hand-held device 20 relating to the purchasing individual's particular financial transaction during an authentication process for a financial transaction previous to the particular financial transaction (for example the immediately previous transaction) or especially if the financial transaction is the first such financial transaction under the account, the server computer 30 may send the command packet during the purchasing individual's enrollment.

Method 200 may also include a step 260 of the hand-held device wirelessly transmitting to the server computer a composite security data record conforming to the command packet. The composite security data record may include fractional biometric data of different types of the individual in a form of mathematical data and may include other security data including at least one of (i) a password, (ii) an answer to a security question, (iii) GPS location information and (iv) a key for the hand-held device, for authentication matching against the database during the attempted financial transaction of the purchasing individual. In a further step 270 of method 200 server computer 30 may determine whether or not the purchasing individual is authorized to proceed to pay for the transaction, for example using a credit card, and may notify a credit card company or other institution of the result of the authorization decision.

In any of the methods or the system of the present invention, if the purchasing individual is not allowed to proceed with the transaction due to fraud being suspected, the hand-held device 20 may ring or sound an alarm. The alarm may include a message requesting further data to proceed with the transaction. In addition, if the purchasing individual is allowed to proceed, then during the charging process that may follow authentication, a method of the present invention may further comprise adding GPS data to a data profile of the enrolling individual.

In a further version of method 200, the enrolling individual may transmit expected location information concerning the location of the hand-held device 20 of the enrolling individual, for example by providing an address or addresses where the enrolling individual may be during financial purchases. Furthermore, location information may include the location of the hand-held device 20 during prior financial transactions. In this regard, system 10 may further comprise a GPS system 70 that may be in communication with server computer 30 so as to report results of the GPS system's 70 tracking the movement of hand-held device 20 from a time of enrollment until the attempted financial transaction. The server computer 30 may match the GPS tracking information against the expected location information during the authentication process and/or before such transaction. The server computer 30 may also utilize time data of each transaction (i.e. the date and time of each transaction obtained for example from the GPS) together with location information of each transaction to calculate whether it is reasonable for the purchasing individual to have been able to travel from a first location in for example New York City at 9:00 a.m. to Pennsylvania Avenue in Washington, D.C. at 9:15 am whether such time/location information raises a suspicion of a fraud attempt. In addition, an exception list may be maintained by the server computer 30 to help in this process. In that regard, for example, any enrolling individual may provide information in advance notifying the server computer of unusually fast travel communications that may be anticipated and which would therefore overrule any fraud suspicion any allow the transaction to be approved.

To further validate the authentication decision, system 10 and methods 100, 200 may use multiple channels for communications during the authentication process. Accordingly, the out of band communication may include two or more of the following: (i) matching a unique key of the hand-held device that may have been provided prior to the transaction or even during the transaction, (ii) tracking of a location of the hand-held device by a GPS in communication with the server computer and matching the location information with location information provided during enrollment and during prior financial transaction on the account and (iii) answering a security question (which may include selecting a photo).

The present invention may also be described as a method of identity authentication for mobile financial transactions. In a first step, prior to an attempted financial transaction, the method may involve reading into a first biometric reader integrally attached to a hand-held device a first biometric data of a first type from an individual. In a second step, the method may involve transmitting a second biometric data of a second type from the enrolling individual to a server computer over a telecommunications network, the first type and the second type selected from the group consisting of fingerprints, pupil movement recognition data, iris scanning data, retinal recognition data and voice prints, facial biometric data, ear biometric data, and bio prints.

This method may also involve a step, at a time of an attempted financial transaction by a purchasing individual, involving the purchasing individual submitting the first biometric data through the hand-held device and the second biometric data through the telecommunications network. In a further step, method may involve using a server computer in communication with the hand-held device to vary a percentage and a portion of each of the first and second biometric data.

The method may include a further step of transmitting to the server computer the instructed percentage and portion of each of the first and second biometric data. The method may also include a step of determining whether the purchasing individual is authorized to proceed to pay for the transaction using a credit card and notifying a credit card company of an authorization decision.

The present invention may be described as a method of identity authentication for mobile financial transactions in which a first step may include prior to an attempted financial transaction, reading and transmitting a multiplicity of security items associated with an enrolling individual to a server computer from a hand-held device, the hand held device reading at least two of the security items using readers of the hand-held device, the multiplicity of security items including at least a first biometric data of a first type and a second biometric data of a second type from the enrolling individual, the first type and the second type selected from the group consisting of fingerprints, pupil movement recognition data, iris scanning data, retinal recognition data and voice prints, facial biometric data, ear biometric data, and bio prints. Besides the two or more biometrics, the multiplicity of security items may also include at least one of a password, an answer to a security question, GPS date, time and location information and a key for the hand-held device, The method may further comprise the server computer sending a command packet 55 to the hand held device instructing a purchasing individual to transmit the multiplicity of security items. The command packet 55 may have contents that include (i) what percentage and segment of each security item in the multiplicity to transmit to the server computer, (ii) which channel of communication to use for said transmission of each said percentage and segment, (iii) in what sequence should each of the channels of communication be used for the sending of each percentage and segment of said security item, the server computer using an automatic process to select the contents. For example, the contents may include instructions to send 28% of the fingerprint beginning at a defined point or maker in the fingerprint so as to create a certain segment of the fingerprint, via WIFI followed by 44% of a retinal scan via email followed by 28% (the percentages need not add up to 100%) of a hand held device key by cellular communication to the server computer. If the wrong percentage is sent, or if the right percentage but the wrong segment (since that percentage was begun from the wrong point in the security item) of the fingerprint or other security item was sent, or if the segments are sent through the wrong channels of communication, or if everything is correct except the sequence of channels of communication deviates from the contents in the command packet, a red flag for fraud may be raised and permission may be denied to proceed to pay for the transaction. Sequence of channels of communications should be understood to also include whether transmissions are made sequentially or concurrently.

The automatic process may allow the contents of the command packet 55 to vary from one financial transaction to another. Command packet 55 may be sent under circumstances discussed above for command packets in methods and system 10 of the present invention.

A further step of the method may be that at a time of an attempted financial transaction by an enrolled purchasing individual, the hand held device may transmit the multiplicity of security items to the server computer in accordance with the instructed percentage, segment, channel of communication and sequence specified in the contents of the command packet 55. The method may also comprise determining whether an unknown purchasing individual sent a multiplicity of security items to the server computer using the hand held device in accordance with the instructions found in the contents of the command packet in order to determine if the unknown purchasing individual is an enrolled purchasing individual and is authorized to proceed to pay for the transaction.

By using multiple layers, multiple channels, multiple sequences, multiple biometrics and other security items, etc., the risk of fraud may be significantly minimized. Applicant has selected the name Bio-Flex Metrics to denote the editable mathematical biometrics described in this patent application.

It should be understood that in any of the methods and systems described, at least in some embodiments, some or all of the additional security data and some or all of the alternative channel communication may be transmitted to the server computer 30 separately from the transmission of the composite biometric security data that the hand-held device 20 may transmit to server computer 30 in response to a command packet. Accordingly, in such cases, the digital processor of the server computer 30 may not be programmed to revive, and the digital processor of the band-held device 20 may not be programmed to send these additional security data. Some of this security data, such as the unique hand-held device key, the GPS location information and the date and time of the transaction does not require input from the purchasing individual and may occur out of the control of the purchasing individual. This may further enhance the reliability of the method and system of authentication of the present invention. On the other hand, the answer to the security question, which may include selection of a photo, as well as input of a password, may require input by the purchasing individual but still may or may not be included together with the composite biometric data transmitted by the hand-held device to the server computer or may be sent separately in these embodiments.

Any of the methods or systems of the present invention may also utilize distributed database records that may make use of an authentication outcome other than complete authentication and complete denial of authentication. For example, the server computer may use the distributed database to have an outcome of a percentage of authentication ranging between 0-100 percent. This may be accomplished, for example, by ascertaining the number of authentication fields in the data record that has been authenticated. In some cases, an average, a weighted average or any other suitable mathematical function may be used to characterize the spectrum of authenticated and non-authenticated fields. If the database is a distributed database linked to the server computer, the database may mesh data records.

FIG. 2, 3, 7, 8A-8C, 9, 10, 11 should be understood to provide non-limiting illustrations of what a hand-held device 20 could look like and is not intended to be limited to these embodiments.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method of identity authentication for transactions, comprising:
   (a) at a time of establishing an account usable for transactions
   reading into a first biometric reader integrally attached to a hand-held device a complete first biometric data of a first type from an enrolling individual,
   reading into a second biometric reader integrally attached to the hand-held device a complete second biometric data of a second type from the enrolling individual, the first type and the second type selected from the group consisting of fingerprints, pupil movement recognition data, iris scanning data, retinal recognition data, voice prints, facial biometric data, ear biometric data, and bio prints;
   converting the complete first and second biometric data into mathematical data;
   breaking the first and second biometric data into segments providing incomplete biometric data that alone is not useful, and wirelessly transmitting over a network individual segments of the first and second biometric data in a form of mathematical data to a server computer linked to a database for re-combination by the server computer and entry into a record of the database as a complete first biometric data and as a complete second biometric data;
   (b) at a time of an attempted financial transaction by a purchasing individual, the first reader of the hand-held device reading a first biometric data of the purchasing individual and a second reader of the hand-held device reading a second biometric data of the purchasing individual;
   (c) the server computer automatically selecting a first percentage of the first biometric data stored in the hand-held device and a second percentage of the second biometric data stored in the hand-held device to be transmitted to the server computer from the hand-held device and sending a command packet to the hand-held device defining a percentage of a biometric field for the first and for the second biometric data that the hand-held device should send to the server computer and defining a place within the biometric field to start selecting from, the first percentage being less than 100% and the second percentage being less than 100%;
   (d) the hand-held device transmitting to the server computer a composite security data record conforming to the command packet including fractional biometric data of the individual in a form of mathematical data and including other security data, the other security data including at least one of (i) a password, (ii) an answer to a security question, (iii) GPS date, time and location information and (iv) a key for the hand-held device, for authentication matching against the database during the attempted transaction of the purchasing individual, the composite security data record not matching the first biometric data, the composite security data record not matching the second biometric data, the composite security data record containing only a selected fragment of the first biometric data and a selected fragment of the second biometric data of the purchasing individual; and
   (e) determining whether the purchasing individual is authorized to proceed to pay for the transaction using a credit card by matching the selected fragment of the first biometric data against the record of the complete first biometric data and by matching the selected fragment of the second biometric data against the record of the complete second biometric data, the determining of whether the purchasing individual is authorized to proceed is without ever assembling the selected fragment of the first biometric data with a remaining unselected fragment of the first biometric data and without ever assembling the selected fragment of the second biometric data with a remaining unselected fragment of the second biometric data.

2. The method of claim 1, further comprising the enrolling individual transmitting expected location information concerning the hand-held device based on a user address and prior transactions and further comprising a GPS system in communication with the server computer tracking movement of the hand-held device from a time of enrollment until the attempted financial transaction, the server computer matching the GPS tracking information against the expected location information, the expected location information optionally can be coupled with in any combination of prior approved authentication data, bio prints, images.

3. The method of claim 1, further comprising using off band communications during authentication in improve authentication, the off band communication including at least two of (i) matching a key of the hand-held device, (ii) tracking of a location of the hand-held device by a GPS in communication with the server computer and matching the location information with location information provided during enrollment and during prior financial transaction on the account and (iii) answering a security question.

4. The method of claim 1, wherein the server computer automatically selects the first and second percentage by a random process.

5. The method of claim 1, further comprising transmitting a unique key of the hand-held device to the server computer at the time of enrollment.

6. The method of claim 1, wherein the server computer sends the command packet to the hand-held device relating to the purchasing individual's particular financial transaction during one of (i) an authentication process for a financial transaction previous to the particular financial transaction and (ii) the purchasing individual's enrollment.

7. The method of claim 6, wherein the command packet is sent during the purchasing individual's enrollment only if the particular financial transaction is the purchasing individual's first financial transaction under the account.

8. The method of claim 1, further comprising, after authentication has been approved, (a) the hand-held device loading charging data onto an antenna integral to the hand-held device, (b) actuating the antenna to slide and project out of the hand-held device and (c) swiping the antenna across a magnetic strip of a charge card reader to charge the purchasing individual's account for the financial transaction.

9. The method of claim 8, further comprising swiping the antenna while the antenna remains attached to the hand-held device.

10. The method of claim 8, further comprising using a time-based feature to automatically delete the charging data from the antenna a pre-defined short time after loading the charging data onto the antenna.

11. The method of claim 8, further comprising the charging data automatically being deleted from the antenna when the antenna slides back into the hand-held device.

12. The method of claim 8, further comprising detaching the antenna from the hand-held device and wherein the charging data is automatically deleted from the antenna after a pre-defined period of time after detachment.

13. The method of claim 1, further comprising sending credit card charging data to a display of the hand-held device to assist in charging account without swiping a charge card reader.

14. The method of claim 1, wherein the hand-held device is a mobile telephone, a dongle or a genius card.

15. A system for securing financial transactions of a purchasing individual made from a mobile communication device, comprising:
- a mobile communication device having integrally attached thereto a first reader of a first type of biometric data and a second reader of a second type of biometric data, the first and second types of biometric data selected from the group consisting of fingerprints, voice prints, pupil movement recognition data, iris scanning data, retinal recognition data, facial biometric data, ear biometric data and bio print, the first reader reading a first biometric data and the second reader reading a second biometric data;
- a digital processor, operatively attached to the readers and programmed by software to convert any non-mathematical data in the first and second biometric data into a form of mathematical data, the digital processor also programmed to implement a command packet received during authorization of a financial transaction from a server computer containing command code delineating what percentages and what segments of each of the first and second biometric data to select for a composite security data record;
- a database for storing records of first and second biometric data as a complete first biometric data and as a complete second biometric data and for storing other security data of individuals enrolling in accounts used for financial transactions, the complete first biometric data and the complete second biometric data being in the form of mathematical data;
- a server computer linked to a telecommunications network and to the database and in communication with the hand-held device, the server computer configured to re-combine the first biometric data and the second biometric data into a record of the database as a complete first biometric data and a complete second biometric data, the server computer having software that is compatable with the software of the mobile communication device, the server computer programmed to
  - (a) automatically select how much of and which portions of the first and second biometric data in the hand-held device to be transmitted to the server computer and send a command packet to the mobile communication device defining these selections;
  - (b) receive a composite security data record conforming to the command packet including fractional biometric data of the purchasing individual in mathematical form and including other security data, the other security data including at least one of (i) a password, (ii) an answer to a security question (iii) a key for the mobile communication device (iv) GPS location information for authentication metching against the database during the attempted financial transaction of the purchasing individual, the composite security data record not matching the first biometric data, the composite security data record not matching the second biometric data, the composite security data record containing only a selected fraction of the first biometric data and a selected fraction of the second biometric data of the purchasing individual; and
  - (c) determine whether the purchasing individual is authorized to proceed to pay for the transaction using a credit card by matching the selected fraction of the first biometric data against the record of the complete first biometric data and by matching the selected fraction of the second biometric data against the record of the complete second biometric data, the determination of whether the purchasing individual is authorized to proceed is without ever assembling the selected fraction of the first biometric data with a remaining unselected fraction of the first biometric data and without ever assembling the selected fraction of the second biometric data with a remaining unselected fraction of the second biometric data.

16. The system of claim 15, further comprising an antenna slidable from a first position inside the mobile communication device to a second position projecting out of the mobile communication device, the antenna capable of storing charging data and being read by a magnetic strip of a charge card reader upon being swiped to charge the purchasing individual's account for the financial transaction.

17. The system of claim 16, wherein the digital processor is programmed to automatically delete the charging data from the antenna a pre-defined short time after the charging data is loaded onto the antenna.

18. The system of claim 16, further comprising the digital processor programmed to automatically delete the charging data from the antenna when the antenna slides to the second position.

19. The system of claim 15, wherein the server computer is also programmed to match each element of the composite security data record against the database during an attempted financial transaction of the user; the server computer also in operational communication with a GPS for monitoring a location of a user making an attempted financial transaction, the GPS in operational communication with a receiver of the mobile communication device of the user.

20. The system of claim 15, wherein the mobile communication device is selected from the group consisting of a mobile telephone, a dongle attachable to a keychain, a genius card and an information storage tag.

* * * * *